M. J. BOEHL.
COOKING UTENSIL.
APPLICATION FILED APR. 19, 1919.

1,408,256.

Patented Feb. 28, 1922.

Inventor
M. J. Boehl,
By
Attorney

UNITED STATES PATENT OFFICE.

MARY JOHANNAH BOEHL, OF CHENEY, WASHINGTON.

COOKING UTENSIL.

1,408,256.  Specification of Letters Patent.  Patented Feb. 28, 1922.

Application filed April 19, 1919. Serial No. 291,306.

*To all whom it may concern:*

Be it known that I, MARY JOHANNAH BOEHL, a citizen of the United States, residing at Cheney, in the county of Spokane and State of Washington, have invented certain new and useful Improvements in Cooking Utensils; and I do hereby declare the following to be a full, clear, and exact description of the invention, such as will enable others skilled in the art to which it appertains to make and use the same.

My invention relates to improvements in cooking utensils and more particularly to such a device having means for cooking a number of foods at the same time.

An important object of this invention is to provide a cooking utensil similar in construction to a frying pan and provided with a plurality of radially disposed concavo-convex depressions arranged therein and being adapted for the reception of eggs and the like.

A further object of the invention is to provide a cooking utensil of the character described having means to support these concavo-convex depressions in the body portion of the pan at a point spaced from the stove or fire.

A further object of the invention is to provide a cooking utensil of the character described adapted to be stamped from a single blank of metal and having the side walls of the concavo-convex depressions forming partitions to separate the several compartments.

A further object of the invention is to provide a device of the character described which is of highly simplified construction, efficient in use, neat in appearance and cheap to manufacture.

A further object of the invention is to provide a device of the character described, which by virtue of its extreme simplicity and cheapness of manufacture, will meet with commercial favor when placel upon the market.

Other objects and advantages of the invention will be apparent during the course of the following description.

Figure 1:
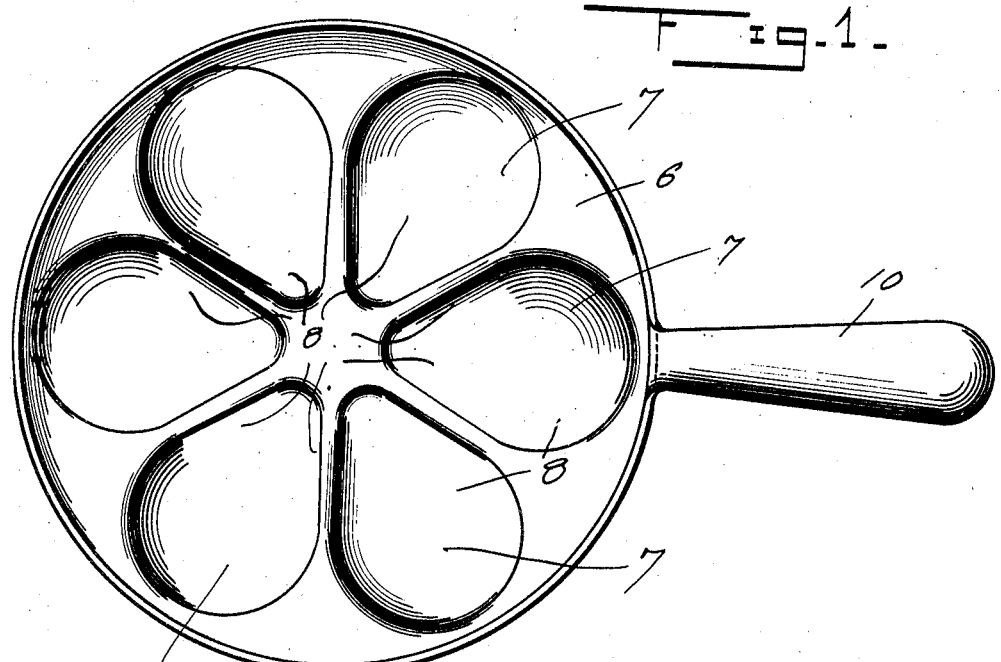
Figure 2:
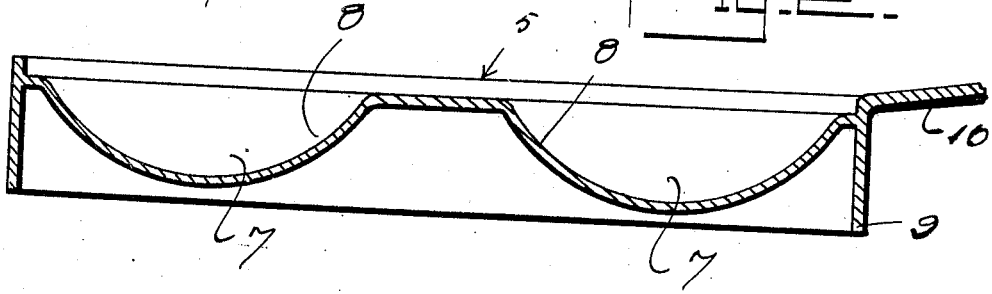
Figure 3:
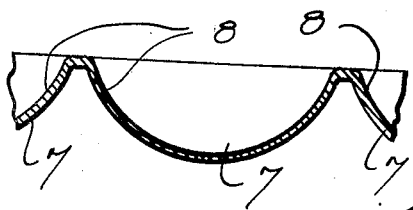

In the accompanying drawings forming a part of this specification and in which like numerals are employed to designate like parts throughout the same, Figure 1 is a plan view of a cooking utensil embodied in the invention, Figure 2 is a central vertical longitudinal sectional view through the same, and, Figure 3 is a fragmentary sectional view through the device.

In the drawings wherein for the purpose of illustration is shown the preferred embodiment of my invention, the numeral 5 generically designates the pan, which in manufacture may be stamped from a single blank of metal, preferably steel. The body portion of the device comprises a circular plate 6 having disposed therein, a plurality of radial concavo-convex depressions 7. As clearly shown in Figure 1, the compartments 7 taper towards their inner ends and are provided with rounded side walls 8. Particular attention is called to the fact that the device may be easily kept in a highly sanitary condition for reason of the absence of dirt collecting corners and vertical partitions which are common to devices of this character. A circumferential vertically disposed rim 9 is formed integral with the plate 6 and is adapted to support the same above the flame or stove. As clearly shown in Figure 2, the upper edge of the rim 9 projects above the plane of the plate 6 and the lower edge thereof projects beneath the concave compartments thus spacing the compartments 7 from the stove. A handle 10 projects from the rim 9 and is formed integrally therewith.

In the use of my device, it will be obvious that a number of foods may be cooked in the several compartments 7 at the same time. Thus should it be desired to cook a number of eggs in different styles, this may be accomplished by placing the eggs separately in the compartments 7 and cook them as desired.

While I have shown and described the preferred embodiment of my invention, it is understood that I may make such minor changes in arrangement and construction of parts, as will remain within the spirit of the invention and the scope of the appended claims.

Having thus described my invention, what I claim is:

1. A cooking utensil having a plate provided with substantially ovate depressions having the containing surface concaved so that the depressions will conform substantially to the shape of a spoon, the longer dimensions of the depressions being radially disposed and the depressions being separated to provide reinforcing ribs and a central portion from which the ribs radiate.

2. A one-piece cooking utensil having a plate provided with substantially ovate depressions having the containing surface concaved so that the depressions will conform substantially to the shape of a spoon, the longer dimensions of the depressions being radially disposed and the depressions being separated to provide reinforcing ribs and a central portion from which the ribs radiate, a supporting rim depending from the plate and below the depressions to prevent contact of the hand with the stove while manipulating the spoon, and a rim rising from the plate and being relatively low to permit substantially horizontal manipulation of the spoon in the depressions.

In testimony whereof I affix my signature in presence of two witnesses.

MARY JOHANNAH BOEHL.

Witnesses:
R. H. MACARTNEY,
LIZZIE MAHN.